United States Patent Office 3,481,230
Patented Dec. 2, 1969

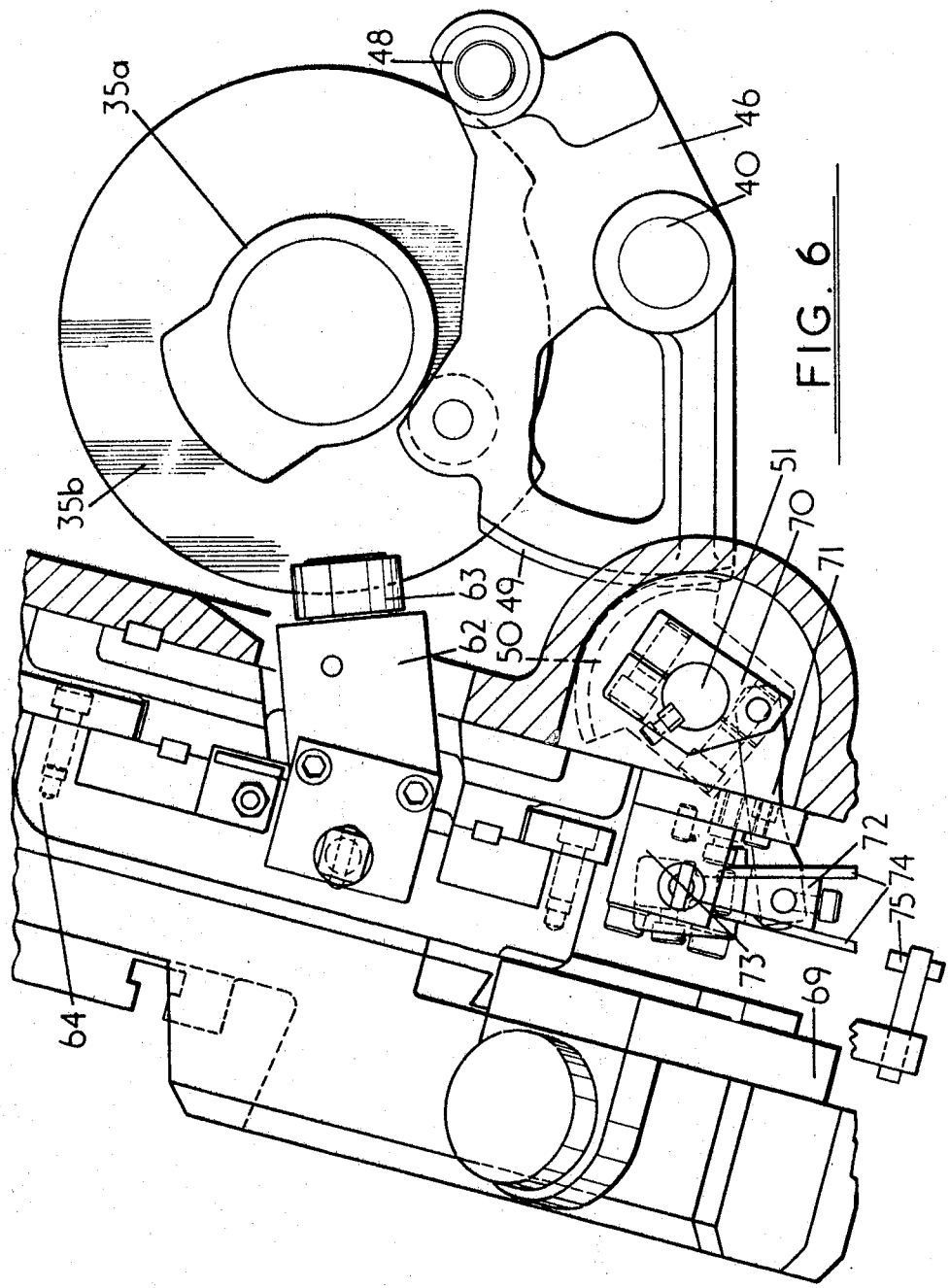

3,481,230
AUTOMATIC MACHINE TOOLS
Dennis Horobin, Kenilworth, England, assignor to Wickman Machine Tool Sales Limited, Coventry, England
Filed Aug. 3, 1967, Ser. No. 658,236
Claims priority, application Great Britain, Aug. 3, 1966, 34,766/66
Int. Cl. B23b 3/00, 7/00, 9/00
U.S. Cl. 82—2                                    4 Claims

ABSTRACT OF THE DISCLOSURE

In a single spindle automatic machine tool of the rear or inclined bed type with multiple tool slides there is at least one tool slide which can move both lengthwise and transversely of the machine, under the control of separate cam type control mechanisms in the bed of the machine.

---

This invention relates to automatic single spindle machine tools of the rear or inclined bed type having a plurality of tool slides to perform machining operations upon workpieces, the aggregate of the movements of these tool slides being in a plurality of directions.

The object of this invention is to provide a control mechanism of the kind referred to in a convenient form.

In accordance with the present invention a single spindle machine tool of the rear or inclined bed type has a plurality of tool slides, at least one of which is mounted for both lengthwise and transverse movement towards and away from a workpiece holder on the machine, such lengthwise and transverse movement being controlled by respective cam type control mechanisms in the machine.

Figure 1:
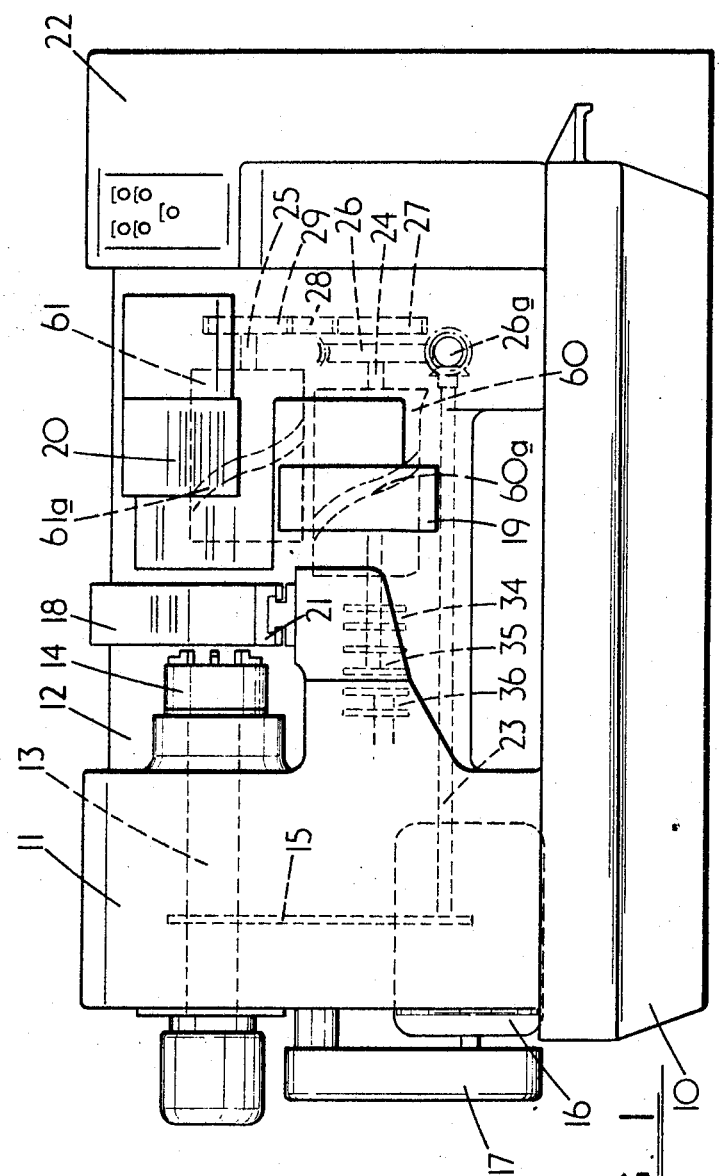
Figure 2:
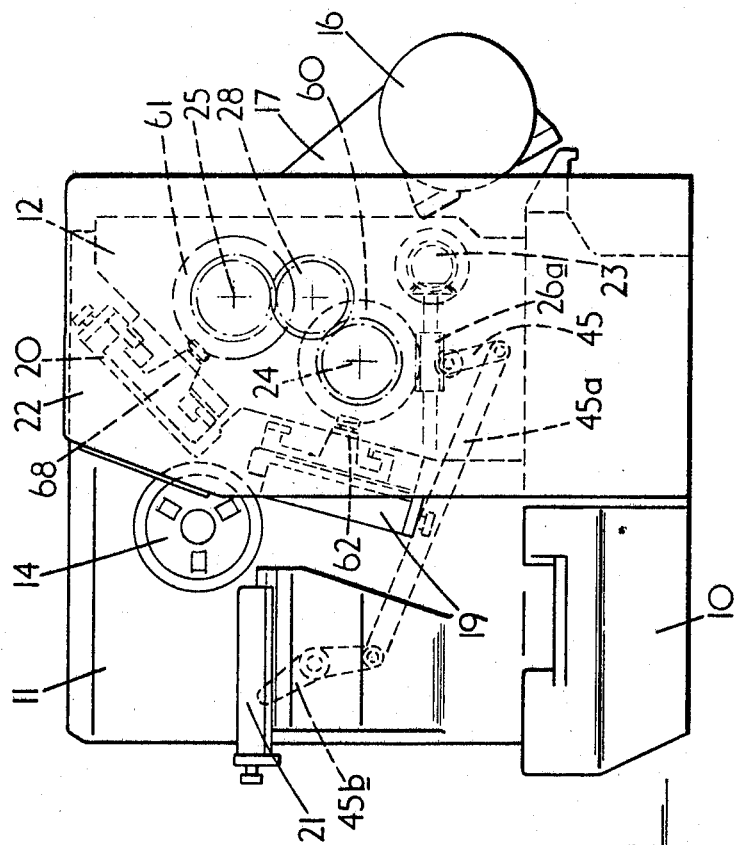
Figure 3:
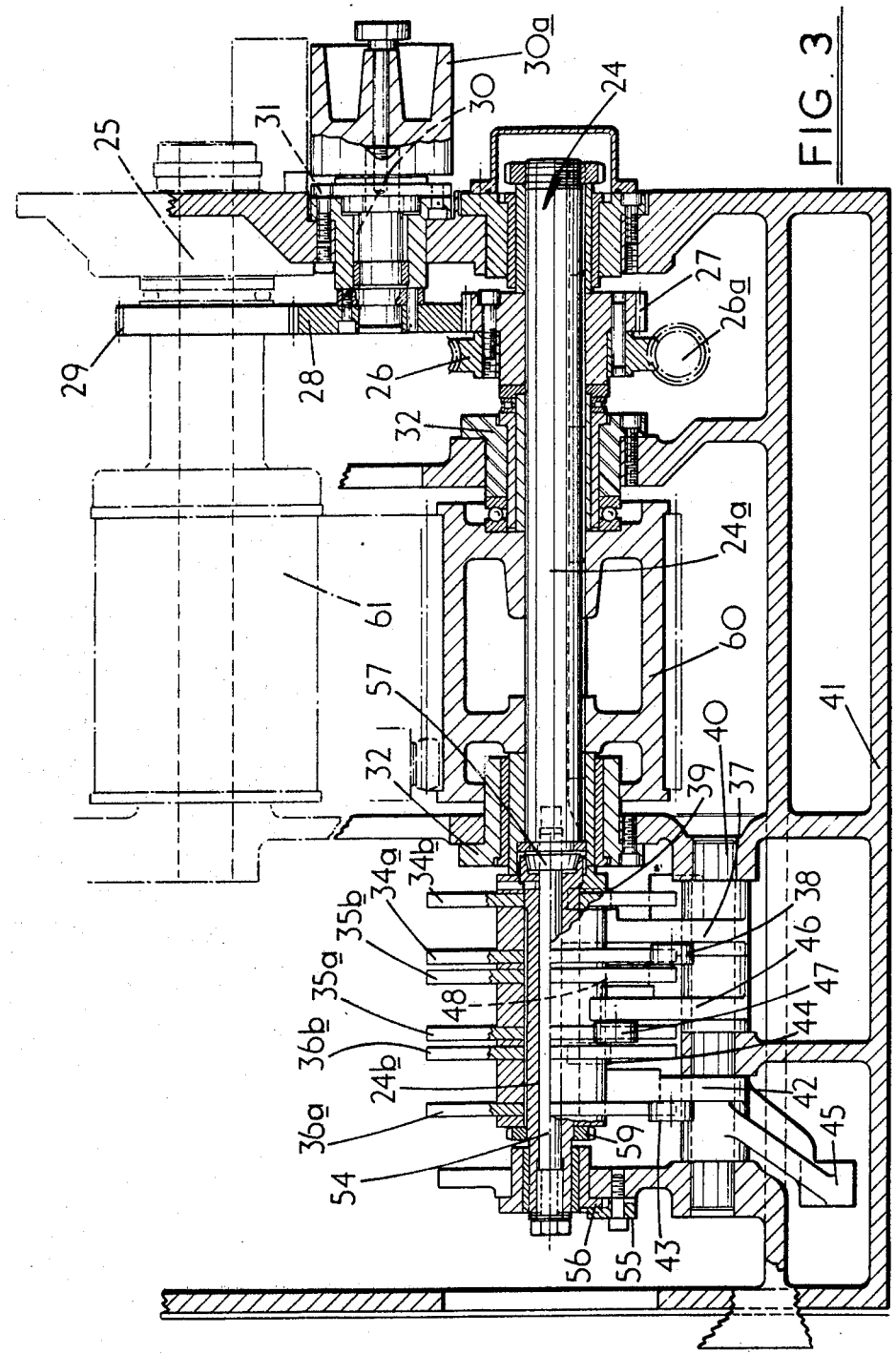
Figure 4:
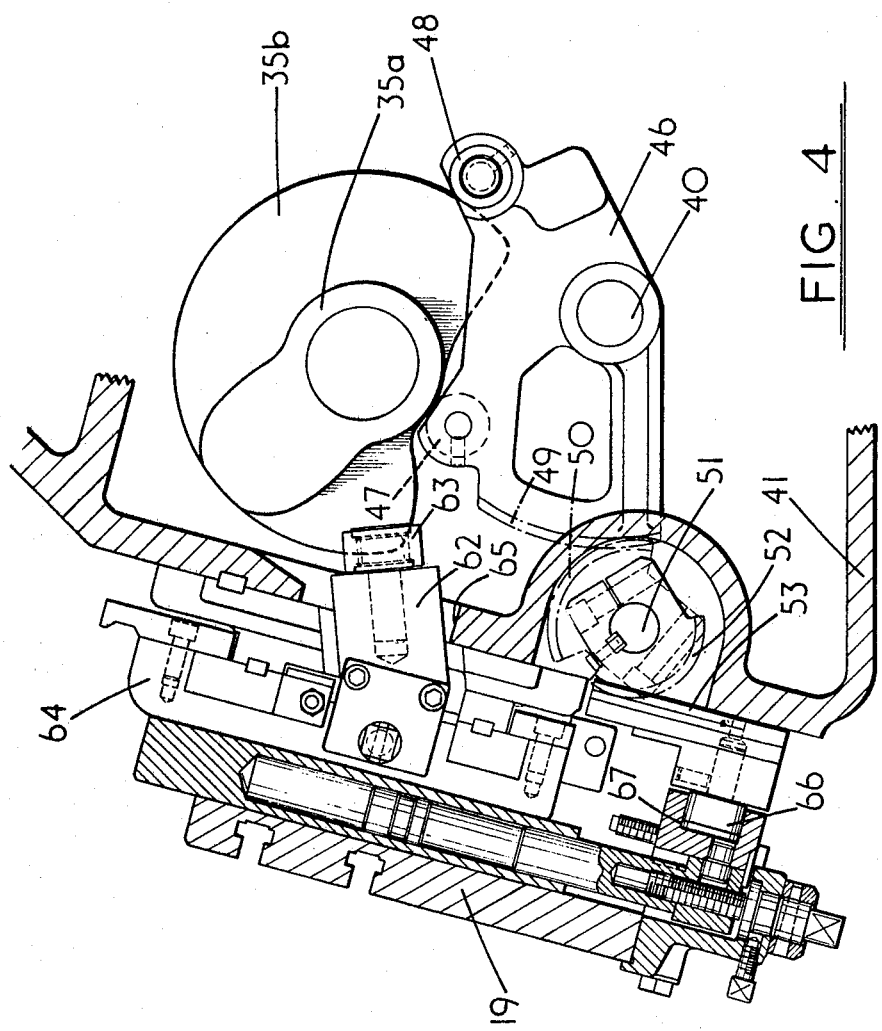
Figure 5:
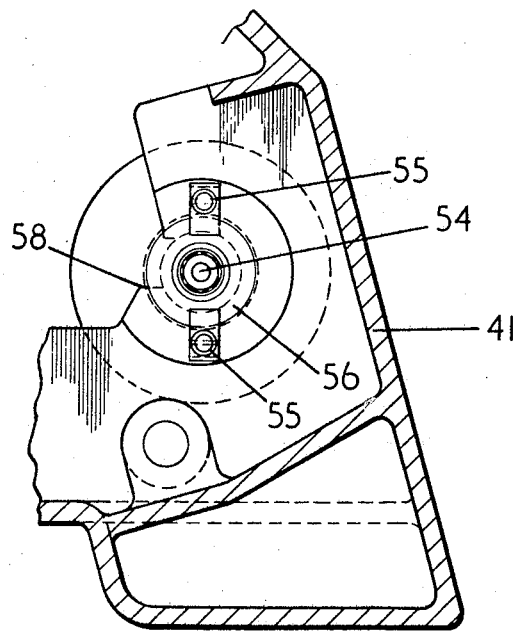

The invention will now be described with reference to the accompanying drawings in which:

FIGURE 1 is a side elevation view of a machine tool incorporating the present invention, FIGURE 2 is an end elevation view, FIGURE 3 is a view on an enlarged scale of control mechanism in the machine, FIGURE 4 is a still further enlarged cross-sectional view of parts of the control mechanism, FIGURE 5 is a fragmentary end elevation view of the mechanism shown in FIGURE 3, and FIGURE 6 is a view similar to FIGURE 4 showing an alternative arrangement of the control mechanism for use with a copying device.

The machine tool illustarted is of the rear or inclined bed type in which there is a base 10 carrying two superstructures. These are a headstock 11 and the rear or inclined bed 12. The headstock 11 carries a single work spindle 13 on which is shown a workpiece holder in the form of a chuck 14.

The headstock 11 encloses gearing 15 whereby the work spindle 13 is driven from an electric motor 16, through an external transmission indicated at 17.

The bed 12 of the machine, as illustrated in FIGURE 2, is wholly behind the axis of the work spindle 13 with respect to an operator who stands at the left of the machine as illustrated in that figure.

On the bed 12 are slidably mounted three tool slides 18, 19, 20, there being a further tool slide 21 slidably mounted upon an extension of the headstock, at the side of the work spindle axis remote from the bed 12 of the machine. The manner in which the permitted movements of the tool slides is accomplished will be more fully described but the movements of the slides are: that the slides 18 and 21 can be travered in a direction, referred to as transverse, at right angles to the work spindle axis, whilst the tool slide 19 can be moved in two mutually perpendicular directions, one at right angles to the work spindle axis and one, referred to as longitudinally of the machine, parallel thereto. The tool slide 20 can only move in a direction parallel to the work spindle axis.

Other tool slide arrangements can however be arranged upon the machine, possible tool slides including those conventionally referred to as rear cross tool slides, lower compound tool slides, end working tool slides, front cross tool slides, rear compound tool slides, rear hydraulic copying slides and lower hydraulic copying slides. Morever, the tool slide 21 may, if desired, be set at an angle instead of the horizontal attitude illustrated.

At the end of the machine remote from the headstock 11, is a housing 22 for electrical control gear whereby the automatic functioning of the machine is achieved.

The bed 12 forms a housing for mechanical control mechanisms which actuate the tool slides 18, 19, 20 and 21. An input shaft 23 for these mechanisms is connected through gearing (not shown) with the motor 16. These control mechanisms are illustrated in FIGURE 3 and are mounted upon two parallel shaft assemblies 24, 25 extending lengthwise of the machine, the lower one 24 of these shaft assemblies being provided near its end remote from the headstock 11 with a toothed wheel 26 engaged by a worm 26a. The worm is driven through bevel gears from the input shaft 23 for the control mechanisms. Adjacent to the wheel 26 is a gear 27 meshing with an idler gear 28, which in turn meshes with a gear 29 carried upon the upper shaft assembly. The gears 27 and 29 are of equal size so that the shaft assemblies are driven in unison and in the same direction. In order that that angular position of the upper shaft assembly 25 with respect to the lower can be adjusted, a releasable coupling 30 is provided in association with the idler gear 28 so that this can be released from meshing engagement with the gear 29, but retaining engagement with the gear 27 in order that timed relationship is not lost between the dogs mounted on a drum 30a and the shaft assembly 24. This coupling 30 can be manipulated by releasing the clamping screws 31.

The lower shaft assembly 24 comprises two portions indicated by 24a and 24b respectively. The portion 24a is mounted in bearings 32 and the portion 24b carries a plurality of pairs of disc cams, there being, in this example, three such pairs, designated 34, 35 and 36. Suffixes a and b are used to show that each pair comprises a first cam (suffixed a) actuating the associated tool slide in a forward or cutting direction, and a second cam (suffixed b) for performing return of the tool slide. The cams 34 actuate the tool slide 18 through a rocking cam follower 37 carrying a pair of rollers 38, 39 engaging the cams 34a, 34b respectively and through a push rod assembly (omitted for clarity). The cam follower 37 is mounted upon a shaft 40 journalled in the machine bed casting which is indicated at 41.

Also carried upon this shaft 40 is a further cam follower 42 carrying a pair of rollers 43, 44 engaging the cams 36a and 36b respectively. On this cam follower 42 is integrally formed an arm 45. The free end of this is connected to a link 45a (seen in FIGURE 2), the opposite end of this link being connected to a bell-crank lever 45b which engages the tool slide 21. The rocking movement of the cam follower 42 thus controls the movement of the tool slide 21 towards and away from the work spindle axis in order to perform work.

The shaft 40 also carries a further similar cam follower 46 carrying two rollers 47, 48 engaging the cams 35a and 35b respectively. As illustrated in FIGURE 4 the cam follower 46 is formed with a gear segment 49 meshing with a smaller gear segment 50. The latter gear segment is formed on a part non-rotatably fixed to a shaft 51. This shaft also has fixed to it another gear segment 52 engaging a rack 53. The rack 53 is connected to the tool slide 19 and this arrangement enables this tool slide 19 to be reciprocated, as the shaft assembly 24 is rotated, towards and away from the work spindle axis. Figure 4 illustrates the manner in which the cam 35a causes the cam follower 46 to rock thus rotating the gear segment 49. This causes movement of the rack 53, through the gear segments 50 and 52. The cam 35b causes the cam follower 46 to be rocked in the other direction which results in return stroke of the tool slide 19. Both rollers 47 and 48 continuously follow their associated cam profiles so that backlash in the mechanical control mechanism is minimised.

Similar cam forms occur on the pairs of cams 34 and 36, though their relationship to their cam followers is dependent upon the length and relative timing of the tool slide strokes which are required.

In order that different cam forms may be used, the portion 24b of the shaft assembly 24 is readily detachable. To accomplish this, a screwed rod 54 passing through the hollow shaft portion 24b is slackened. As seen in FIGURE 5, two clamping parts 55 retain a collar 56 serving as the bearing at the end remote from the portion 24a of the shaft assembly. The other end of this shaft portion 24b is located upon a conical part 57. The part of the casting 41 to which the end of the shaft portion having the collar 56 is attached has an opening seen in FIGURE 5 at 58 enabling the shaft portion 24b to be withdrawn laterally.

Having thus withdrawn the shaft portion 24b the cams 34 to 36 can be detached by removal of a castellated nut 59 on the shaft portion 24b.

In order to impart movement of the tool slides 19 and 20 in directions parallel to the work spindle axis, the shaft assemblies 24 and 25 have drum cams 60, 61 respectively. Each such drum has in its cylindrical outer surface a groove in the form of two part helices defining a closed loop, as indicated at 60a and 61a in FIGURE 1. In the groove 60a in the drum, cam 60 engages a follower 62 carrying a roller 63, this follower, without the drum cam being shown in FIGURE 4. This follower 62 is secured to the support 64 for the tool slide 19, and extends through an elongated slot 65 in the casting 41 of the bed of the machine. Rotation of the drum cam 60 causes the follower 62 to be moved lengthwise of the machine, that is parallel to the axis of the work spindle 13, during the first half of each revolution, and it is returned during the second half, so that, like the other tool slide movements described, it carries out a complete working and return cycle for each rotation of the shaft assembly 24. As seen in FIGURE 4 the tool slide 19 will thus move in two mutually perpendicular directions during each cycle. Transmission of the movement imparted by the cams 35a and 35b to the tool slide 19 is thus achieved through a connection comprising a roller 66 engaging in a slot 67.

The groove 61a of the drum cam 61 is engaged by a follower 68 which is connected to the tool slide 20, this tool slide being capable of lengthwise movement only.

FIGURE 6 illustrates an alternative form of tool slide to replace the tool slide 19, and to be operated by the cams 35a and 35b and also by the drum cam 60. The tool slide 69 is a copying slide and is mounted upon the support 64 carrying the follower 62. The shaft 51, in addition to carrying the gear segment 50, carries a bracket 70. To this is connected a link 71 which at its opposite end is connected to an arm 72. The arm 72 is pivotally mounted in a block 73 to which can be secured one or two templates 74 which are used in association with the copying slide and follower 75.

Within the housing 22 there are dogs (not illustrated) mounted on a drum 30a which is driven from the shaft 24, the dogs engaging micro switch operating members to control the automatic cycling of the machine, either repeating the cycle automatically in which case some automatic loading and unloading mechanism would be fitted to the machine headstock, or performing one complete cycle and then stopping to permit changing of workpieces.

A hand wheel, not shown, may be provided for manual manipulation of the control mechanisms and this may be released when normal power operation is to be performed.

Having thus described my invention what I claim as new and desire to secure by Letters Patent is:

1. A single spindle machine tool having a rear bed, a workpiece holder mounted upon the single spindle of the machine, at least one tool slide mounted on the rear bed for both longitudinal and transverse movement towards and away from the workpiece holder, a cam mechanism disposed within the rear bed of the machine, said cam mechanism being connected to the tool slide to impart longitudinal movement to the tool slide, and a further cam mechanism disposed within the rear bed, said further cam mechanism being connected to the tool slide to impart transverse movement to the tool slide.

2. A single spindle machine tool having a rear bed, a workpiece holder mounted upon the single spindle of the machine, at least one tool slide mounted on the rear bed for both longitudinal and transverse movements towards and away from the workpiece holder, a drum cam and follower mechanism disposed within the rear bed of the machine, said drum cam follower being connected to the tool slide to impart longitudinal movement to the tool slide, and a disc cam and follower mechanism disposed within the rear bed, said disc cam follower being connected to the tool slide to impart transverse movement to the tool slide.

3. A machine tool as claimed in claim 2 in which the disc cam and follower mechanism includes two disc cams and a rockable follower engaging both disc cams, one of the disc cams performing actuation of the tool slide during a forward or working movement and the other disc cam performing return movement.

4. A machine tool as claimed in claim 2 in which the disc cam and follower mechanism is mounted upon a detachable shaft portion whereby interchanging of individual disc cams can be performed.

References Cited

UNITED STATES PATENTS

| 1,938,050 | 12/1933 | Smith et al. | 82—25 |
| 1,564,216 | 12/1925 | Doane | 82—19 |
| 1,568,641 | 1/1926 | Thacher | 82—19 |
| 2,124,347 | 7/1938 | Groene et al. | 82—19 |
| 2,144,955 | 1/1939 | Antonelli | 82—19 |
| 2,159,207 | 5/1939 | Godfriaux | 82—19 |
| 2,410,026 | 10/1946 | Groene et al. | 82—25 |
| 2,561,035 | 7/1951 | Robichaud | 82—19 |

GERALD A. DOST, Primary Examiner

U.S. Cl. X.R.

82—14, 19, 25